United States Patent [19]

von Plessen et al.

[11] Patent Number: 4,479,924
[45] Date of Patent: Oct. 30, 1984

[54] PROCESS FOR THE SEPARATION OF HEAVY METAL COMPOUNDS FROM PHOSPHORIC ACID

[75] Inventors: Helmold von Plessen, Königstein; Reinhard Gradl, Hürth; Günther Schimmel, Erftstadt, all of Fed. Rep. of Germany

[73] Assignee: Hoechst Aktiengesellschaft, Frankfurt am Main, Fed. Rep. of Germany

[21] Appl. No.: 481,281

[22] Filed: Apr. 1, 1983

[30] Foreign Application Priority Data

Apr. 5, 1982 [DE] Fed. Rep. of Germany ....... 3212675

[51] Int. Cl.$^3$ ............................................. C01B 25/16
[52] U.S. Cl. .................................. 423/321 R; 423/92; 423/99; 423/100; 423/321 S
[58] Field of Search .................. 423/321 S, 321 R, 99, 423/100, 92

[56] References Cited

U.S. PATENT DOCUMENTS

| | | | |
|---|---|---|---|
| 2,044,940 | 6/1936 | Haag et al. | 423/321 |
| 4,208,389 | 6/1980 | Hiraga | 423/321 S |
| 4,226,791 | 10/1980 | Reinhardt et al. | 423/100 |
| 4,369,169 | 1/1983 | Nineuil | 423/321 R |

FOREIGN PATENT DOCUMENTS

| | | |
|---|---|---|
| 3142666 | 5/1983 | Fed. Rep. of Germany . |
| 3209183 | 9/1983 | Fed. Rep. of Germany . |
| 791592 | 12/1980 | U.S.S.R. ........................ 423/321 R |

*Primary Examiner*—Gregory A. Heller
*Attorney, Agent, or Firm*—Curtis, Morris & Safford

[57] ABSTRACT

A process for the separation of heavy metal components, especially of compounds of cadmium, mercury and lead, from crude phosphoric acid obtained according to the Odda process, which comprises adjusting this crude phosphoric acid with ammonia to a pH of from 0.5 to 1.5, contacting it subsequently with a diorganyldithiophosphorus compound and an adsorbent, and then separating the acid from the absorbent containing the heavy metal impurities.

5 Claims, No Drawings

PROCESS FOR THE SEPARATION OF HEAVY METAL COMPOUNDS FROM PHOSPHORIC ACID

The invention provides a process for the separation of heavy metal components, especially compounds of cadmium, mercury and lead, from crude phosphoric acids which are obtained by decomposing crude phosphates by means of nitric acid, and from which the substantial amount of the calcium nitrate formed in the decomposition has been removed.

Phosphorus-containing fertilizers are manufactured in many cases by acidic decomposition of phosphorite or apatite. Under the influence of mineral acid, the scarcely soluble tricalcium phosphate of the crude phosphate is decomposed. The calcium salts of the mineral acids used must subsequently be separated in order to obtain the crude phosphoric acid formed as a product. Metallic impurities such as Cd, Pb, Hg and As contained in the crude phosphate remain in the phosphoric acid in substantial amounts. Because this acid is not suitable for any use, numerous attempts have been made to liberate it from undesirable metallic impurities. For the processing of crude phosphoric acid to fertilizers, however, the proposals made heretofore were unfit for use in industrial practice.

The processes hitherto proposed are particularly unsuitable for freeing the crude phosphoric acid formed according to the known Odda process on decomposition of crude phosphate by means of 60% nitric acid from heavy metal ions. In this Odda process, the wet phosphoric acid from the decomposition, which contains large amounts of nitric acid, is cooled in order to separate the calcium nitrite, the solubility of which depends on the temperature, and the calcium nitrate is separated as tetrahydrate. Heavy metal ions such as Cd, Pb, Hg and As substantially remain in the digestion solution, the so-called mother acid. The solution generally contains about 15–20 weight % of $P_2O_5$, 30–35 weight % of $HNO_3$ and 7–10 weight % of CaO. Usually, it is then neutralized in steps with evaporation of water, and the crystal paste formed is mixed with potassium salts and granulated to give the fertilizer.

It was therefore the object of the invention to provide a process by means of which fertilizers substantially free from heavy metals can be manufactured according to the Odda process.

German Offenlegungsschrift No. 3,142,666 proposes a process for the separation of heavy metal compounds from intermediates for the manufacture of phosphorus fertilizers, wherein the mother acid resulting in the Odda process is adjusted with ammonia to a pH in the range of from 0.5 to 1.5, preferably 0.6 to 1.2, and the phosphoric acid solution so obtained is extracted, preferably in countercurrent, with a solvent which is water-immiscible or water-miscible to a small extent only, selected from the group of dithiophosphoric acid diesters and advantageously used with an inert organic diluent.

In a further embodiment of this invention, German Offenlegungsschrift No. 3,209,183 proposes to carry out the extraction in analogous manner with the use of dithiophosphinic acids and/or dithiophosphonic acid-O esters as extraction agents.

In further development of the above processes, it has been found that, surprisingly, the heavy metal components, especially cadmium, mercury and lead, are eliminated in an especially simple and efficient manner by mixing the phosphoric acid solution obtained in the Odda process and adjusted with ammonia to a pH of from 0.5 to 1.5 with a diorganyl-dithiophosphorus compound and an adsorbent, and then separating the phosphoric acid solution from the diorganyl-dithiophosphorus compound and the adsorbent.

The diorganyl-dithiophosphorus compound and the adsorbent may be used either as mixture, or the diorganyl-dithiophosphorus compound is first added and then the adsorbent. After the treatment, the diorganyl-dithiophosphorus compound and the adsorbent are separated from the purified phosphoric acid.

The subject of the invention is therefore a process for the separation of heavy metal components, especially of compounds of cadmium, mercury and lead, from crude phosphoric acid obtained according to the Odda process, which comprises adjusting this crude phosphoric acid with ammonia to a pH of from 0.5 to 1.5, preferably 0.6 to 1.2, subsequently contacting it with a diorganyl-dithiophosphorus compound and an adsorbent, and then separating the acid and adsorbent.

Suitable adsorbents in accordance with the invention are for example active charcoal, carbon black, ground lignite, porous resins, kieselguhr, bleaching earth, silica gel, synthetic silicic acids, or zeolites. As diorganyl-dithiophosphorus compounds in accordance with the invention, preferably dithiophosphoric acid-O,O diesters (I), dithiophosphonic acid-O monoesters (II) or dithiophosphinic acids (III) of the following formulae

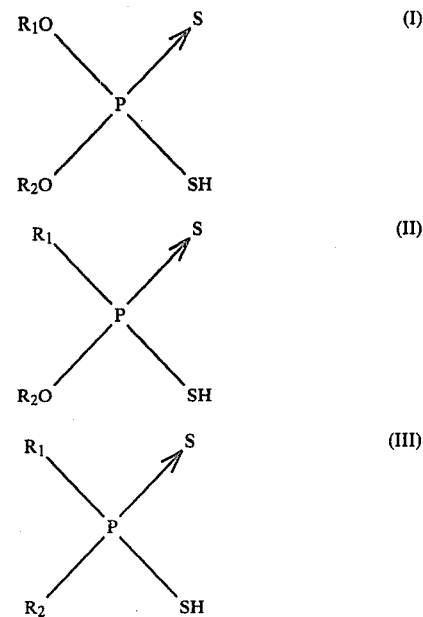

are used, in which $R_1$ and $R_2$, being identical or different, each are a saturated or unsaturated aliphatic, alicyclic, araliphatic or aromatic hydrocarbon radical having from 1 to 24 carbon atoms, which are optionally substituted, and $R_1$ and $R_2$ together have from 2 to 48, preferably 4 to 24, carbon atoms, and may form together an optionally substituted double bond radical.

Examples of diorganyl-dithiophosphorus compounds of the formulae I, II and III according to the invention are Dithiophosphoric acid-O,O-di-(2-ethyl-hexyl)ester
dithiophoshoric acid-O,O-di-isotridecyl ester dithiophosphoric acid-O,O-di-cresyl ester
cyclohexyl-dithiophosphonic acid-O-n-butyl ester
di-cyclohexyl-dithiophosphinic acid
di-tricyclo-decenyl-dithiophosphinic acid.

Mixtures of such diorganyl-dithiophosphorus compounds may likewise be used. In the compounds of the formulae I to III having substituted radicals $R_1$ and $R_2$, substitution by halogen, hydroxy, alkoxy, carboxyl or $NO_2$ groups is preferred. Because the diorganyl-dithiophosphorus compounds are easily oxidizable (they are used furthermore as antioxidants, see French Pat. No. 1,396,093, and U.S. Pat. Nos. 2,523,147, 2,705,694, 2,798,880 and 3,300,409) it was to be expected that the presence of oxidants, such as in the case of high concentration nitration in acidic solution, would be an obstacle for the treatment of the above mother acid by means of the diorganyl-dithiophosphorus compounds according to the invention, The mother acid furthermore contains $NO_x$ stemming from the decomposition.

On the other hand, the treatment of mother acid in a higher pH range is impeded by the simultaneous occurrence of complex precipitates of phosphates, silica gel, calcium, magnesium and aluminum compounds.

Maintenance of the pH range of from 0.5 to 1.5, preferably 0.6 to 1.2, in accordance with the invention is important especially for the reaction of cadmium with the diorganyl-dithiophosphorus compounds, and the separation thereof.

The diorganyl-dithiophosphorus compounds used for the process of the invention are generally products which are scarcely or not at all soluble in water. It has been observed that especially those diorganyl-dithiophosphorus compounds of the formulae I to III which have two hydrophobic organic substituents $R_1$ and $R_2$ are suitable for the process of the invention.

The diorganyl-dithiophosphorus compounds may be used either undiluted or in admixture with one or more inert organic solvents.

For measuring the pH in the concentrated mineral acid solutions, glass electrodes, advantageously single rod gaging chains, reference system Ag/AgCl, reference electrolyte 3 m KCl+AgCl, or 3.5 m KCl, are used. Special hydrogen sulfide resistant single rod gaging chains may be applied which are provided with for example two series-connected electrolyte chambers separated by diaphragms. The pH must be measured in the concentrated solution without dilution, and at room temperature.

It is recommended to contact the ammonia-treated mother acid with the diorganyl-dithiophosphorus compounds and the adsorbent at a temperature of from 10° to 100° C.

The mixture of the diorganyl-dithiophosphorus compound and the adsorbent is advantageously prepared by impregnating the adsorbent with the liquid dithio compounds, dithio compounds solid at room temperature being molten. The resulting mixtures are solid and free-flowing, which allows to separate the purified phosphoric acid easily from the mixture again by decanting, filtration or flotation.

Alternatively, the components diorganyl-dithiophosphorus compound and adsorbent may be added to or mixed with the ammonia-treated mother acid one after the other. After the treatment, the solids mixture is allowed to sediment, and the supernatant phosphoric acid is separated as indicated.

Dosage of dithio compound and adsorbent may be varied within wide limits; however, for reasons of cost it is recommended to keep the corresponding amounts as small as possible.

The ratio of dithio compound to adsorbent may for example result from the maximum receptivity of the adsorbent for the dithio compound; however, a lower than the maximum load is also possible.

Depending on the composition of the mother acid, the amounts of the required purification components may vary, so that it is recommended to evaluate the optimal quantities in preliminary tests.

It is generally sufficient to use the diorganyl-dithiophosphorus compound in an at least 2 to 5-molar amount, relative to the heavy metal ions to be removed, and the adsorbent in an amount of from 0.05 to 5 weight %, relative to the phosphoric acid amount to be purified.

Suitable as adsorbent is any substance which is capable of bonding a sufficient amount of diorganyl-dithiophosphorus compound to its surface in such a solid manner that after removal of the heavy metal the amount of dithio compound remaining in the phosphoric acid in dissolved or emulsified form is practically zero. Such adsorbents are for example active charcoal in powder or grain form, or carbon black such as obtained in the pyrolysis of acetylene or in the pressure gasification of heavy oil in the presence of oxygen-containing gases. Furthermore suitable are natural porous carbon products such as ground and dried lignite. Especially recommended are silicates, particularly aluminosilicates such as zeolites. Preferred are active charcoal, carbon black, porous resins, lignite and silicates.

For separating the metal-charged mixture of dithio compound and adsorbent from the purified mother acid, decantation is recommended in the case of a sufficient difference in density. Alternatively, the reaction mixture can be centrifuged or filtered. Concentration of metal-charged mixtures of dithio compound and adsorbent may be brought about also by flotation.

A further embodiment of the above invention consists in applying the percolation technique. In this case, a coarse-grain adsorbent, for example active charcoal in grain form or compact carbon black, is impregnated with a liquid diorganyl-dithiophosphorus compound, and this mixture is charged to a column. Subsequently, the mother acid to be purified is passed over the adsorber bed, whereby cadmium and other metals adhere to the column. Regenerative stripping of the adsorber bed can be carried out, for example by means of concentrated hydrochloric acid.

To summarize, the process of the invention is distinguished by the following advantages:

The purification can be carried out in one single and simple step; an after-treatment, for example stripping of the phoshoric acid, is not necessary. The reagents are used in small amounts, especially the quantity of diorganyl-dithiophosphorus compound needs to be only slightly above that required for removing the corresponding cations.

The following examples illustrate the invention.

EXAMPLES 1 TO 5

Mother acid obtained by decomposition of crude phosphate with nitric acid according to the Odda process and subsequently clarified was adjusted at room temperature to pH 1.1 by means of gaseous ammonia. 1 g each of the diorganyl-dithiophosphorus compound indicated in the following Table 1 for Examples 1 to 5 was added to samples of 100 g each of this mother acid adjusted to pH 1.1, and stirred for 15 minutes. After addition of 0.5 g each of the adsorbents likewise listed in Table 1 for Examples 1 to 5, the samples were stirred for a further 15 minutes. Subsequently, they were filtered, the phosphoric acid filtrate was mixed with 5 ml of concentrated HCl, and analyzed by atom absorption. The heavy metal contents found were calculated on the mother acid treated with ammonia. Details and results of the Examples 1 to 5 are listed in Table 1 in summarized form.

TABLE 1

| Example No. | Di-organyl-dithio-phosphorous compound | Adsorbent | Cd—compound (µg Cd/g solution) phosophoric acid solution | | Hg content (µg Hg/g solution) phosphoric acid solution | |
| --- | --- | --- | --- | --- | --- | --- |
| | | | before treatment | after treatment | before treatment | after treatment |
| 1 | Dithiophosphoric acid-O,O—di-(2-ethyl-hexyl) ester | active charcoal | 10.37 | 0.12 | 0.054 | <0.012 |
| 2 | Dithiophosphoric acid-O,O—di-(2-ethyl-hexyl) ester | kieselguhr (Celite) | 10.37 | <0.12 | 0.054 | <0.012 |
| 3 | Dithiophosphoric acid-O,O—di-(2-ethyl-hexyl) ester | dried, ground lignite | 10.37 | 0.16 | 0.054 | <0.016 |
| 4 | Dithiophosphoric acid-O,O—di-iso-tri-decyl ester | active charcoal | 10.37 | <0.13 | 0.054 | <0.013 |
| 5 | Cyclohexyl-dithio-phosphonic acid-O—n-butyl ester | active charcoal | 10.37 | 0.12 | 0.054 | <0.012 |

What is claimed is:

1. A method for removing heavy metal compounds of cadmium, mercury, or lead from crude phosphoric acid obtained according to the Odda process, which method comprises adjusting the pH of said crude phosphoric acid with ammonia to a value from 0.5 to 1.5 and then contacting the acid at a temperature from 10° C. to 100° C. with a diorganyldithiophosphorus compound selected from the group consisting of dithiophosphoric acid diesters, dithiophosphonic acid monoesters, and dithiophosphinic acids in an amount which is 2 to 5 times the molar amount of heavy metal ions to be removed and with an amount of an adsorbent which is from 0.05 to 5 percent by weight of the crude phosphoric acid wherein said adsorbent is active charcoal, carbon black, ground lignite, porous resins, kieselgulr, bleaching earth, silica gel, synthetic silicic acids, or zeolites.

2. A method as in claim 1 wherein said diorganoyldithiophosphorus compound is added to said acid together with said adsorbent.

3. A method as in claim 1 wherein said diorganoyldithiophosphorus compound is added to said acid followed by addition of said adsorbent.

4. A method as in claim 1 wherein said diorganoyldithiophosphorus compound is selected from the group consisting of

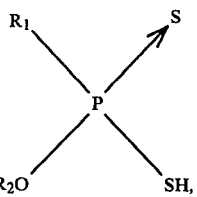

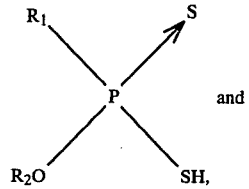 and

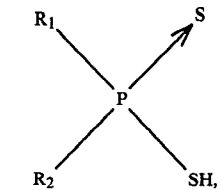

wherein $R_1$ and $R_2$, which are the same or different, taken alone are each saturated or unsaturated, substituted or unsubstituted, aliphatic, alicyclic, araliphatic, or aromatic hydrocarbon having from 1 to 24 carbon atoms, or $R_1$ and $R_2$ taken together form such a divalent hydrocarbon having 2 to 48 carbon atoms.

5. A method as in claim 1 which is continuously performed by passing said acid through a column containing a mixture of said diorganyoyldithiophosphorus compound and coarse grains of said adsorbent.

* * * * *